(12) United States Patent
McCalib, Jr. et al.

(10) Patent No.: US 10,643,038 B1
(45) Date of Patent: May 5, 2020

(54) MULTI SENSOR DOMAIN—MULTI TIER CAMERA SYSTEM FOR PACKAGE IDENTIFICATION

(71) Applicant: Amazon Technologies, Inc., Seattle, WA (US)

(72) Inventors: David Bruce McCalib, Jr., Seattle, WA (US); Oleg Kantor, Kirkland, WA (US); Joshua David Landry, Sr., Auburn, WA (US); Tak Keung Joseph Lui, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 75 days.

(21) Appl. No.: 15/893,248

(22) Filed: Feb. 9, 2018

(51) Int. Cl.
*G06K 7/10* (2006.01)
*H04N 7/18* (2006.01)
*G06T 7/70* (2017.01)
*H04N 5/232* (2006.01)

(52) U.S. Cl.
CPC ..... *G06K 7/10366* (2013.01); *G06K 7/10356* (2013.01); *G06T 7/70* (2017.01); *H04N 5/23206* (2013.01); *H04N 7/181* (2013.01)

(58) Field of Classification Search
CPC .................................................. G06K 7/10366
USPC ............................................................. 235/451
See application file for complete search history.

(56) References Cited

U.S. PATENT DOCUMENTS

| | | | | |
|---|---|---|---|---|
| 10,140,829 | B1 * | 11/2018 | Calvarese | G08B 13/246 |
| 2009/0322489 | A1 * | 12/2009 | Jones | G06K 9/00771 |
| | | | | 340/10.3 |
| 2013/0314534 | A1 * | 11/2013 | Hinman | G06Q 10/08 |
| | | | | 348/143 |
| 2018/0218185 | A1 * | 8/2018 | High | G06K 7/10475 |
| 2019/0107411 | A1 * | 4/2019 | Gil | G01C 21/3632 |

* cited by examiner

*Primary Examiner* — Allyson N Trail
(74) *Attorney, Agent, or Firm* — Patterson + Sheridan, LLP

(57) ABSTRACT

Techniques for monitoring objects being placed onto a plurality of pallets. A controller is configured to analyze images captured by the plurality of camera devices to determine when a first object is placed onto a first one of the plurality of pallets. Upon determining that the first object has been placed onto the first pallet, the controller can determine a first identifier corresponding to the first object using the RFID reader corresponding to the first pallet and can determine an intended pallet corresponding to the first object. Upon determining that the first pallet onto which the first object was placed is not the intended pallet for the first object, the user is notified using the feedback mechanism.

18 Claims, 10 Drawing Sheets

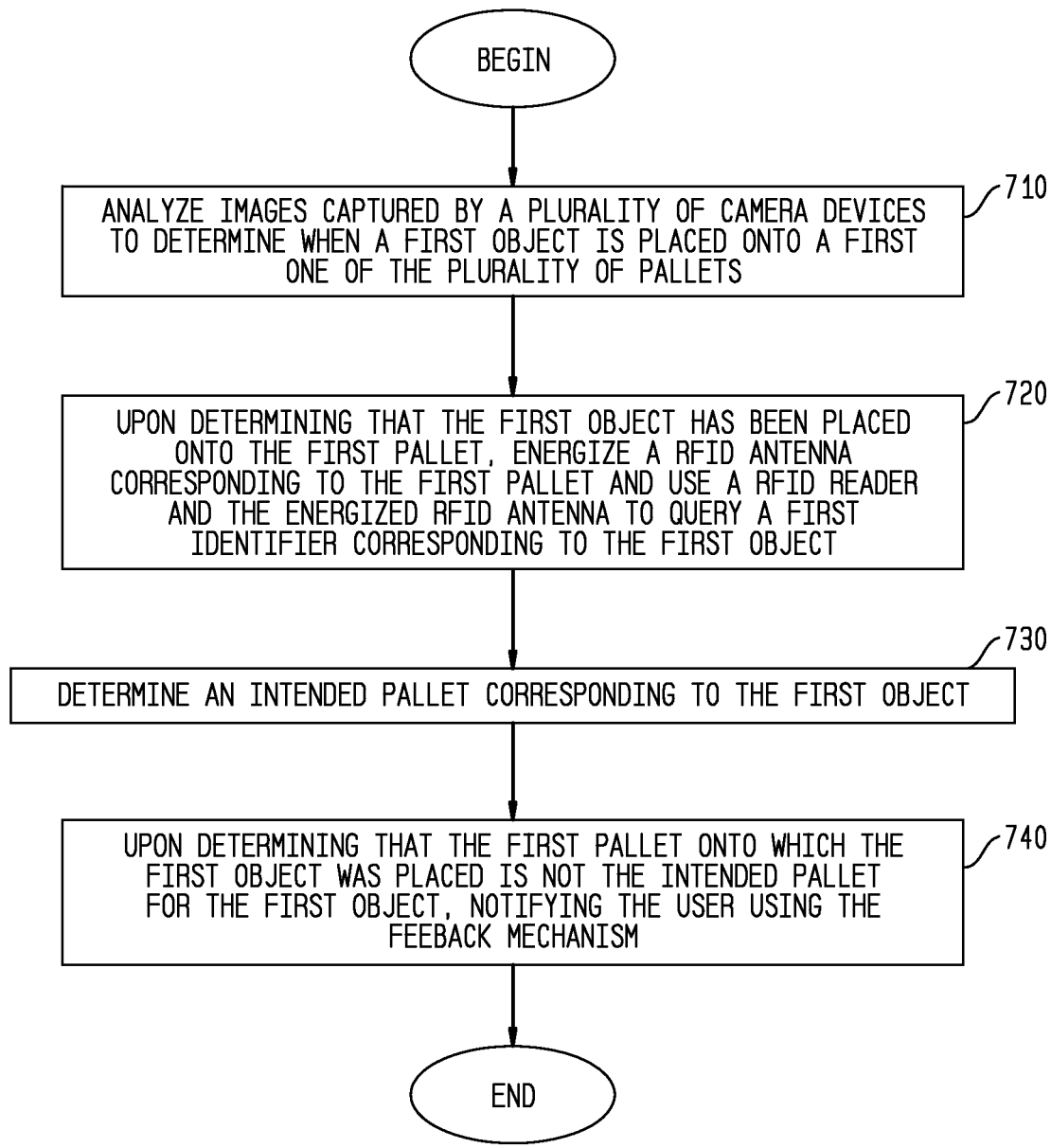

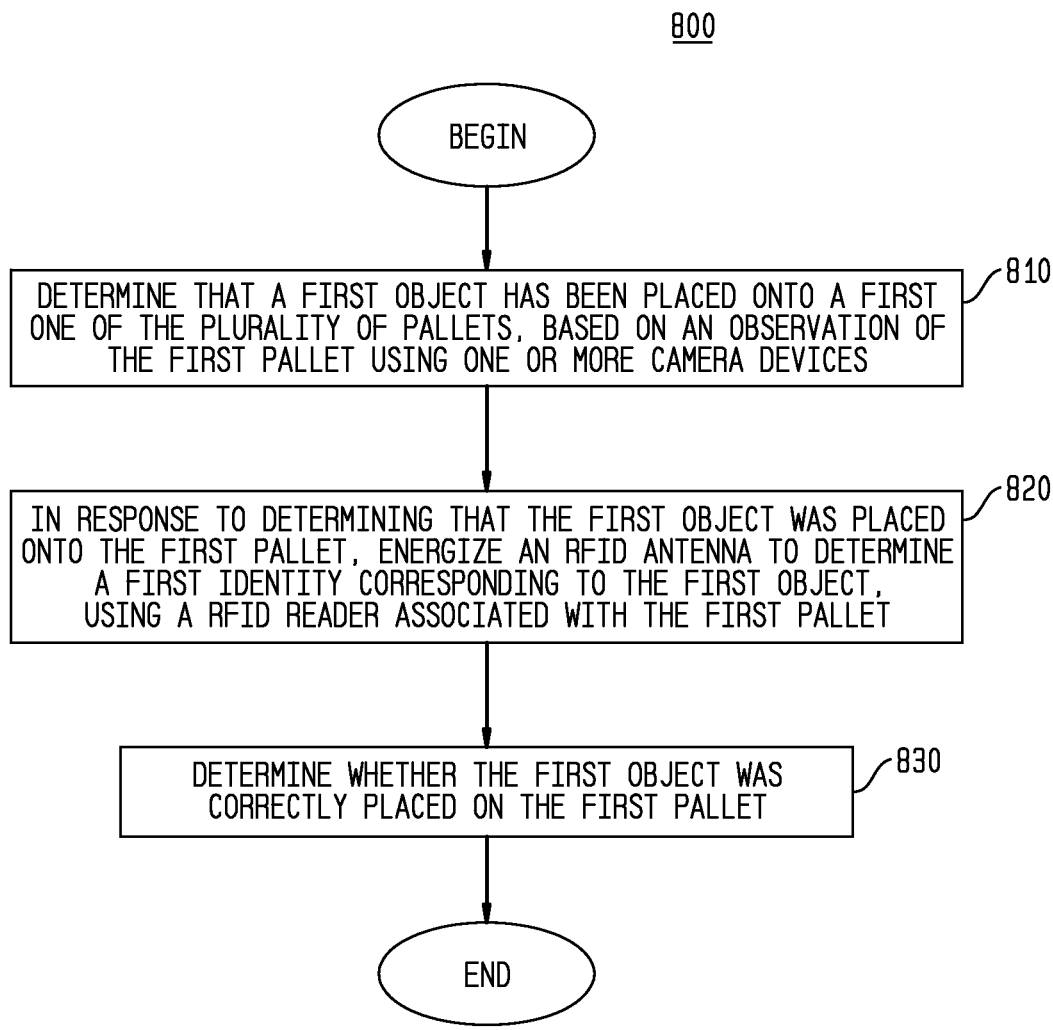

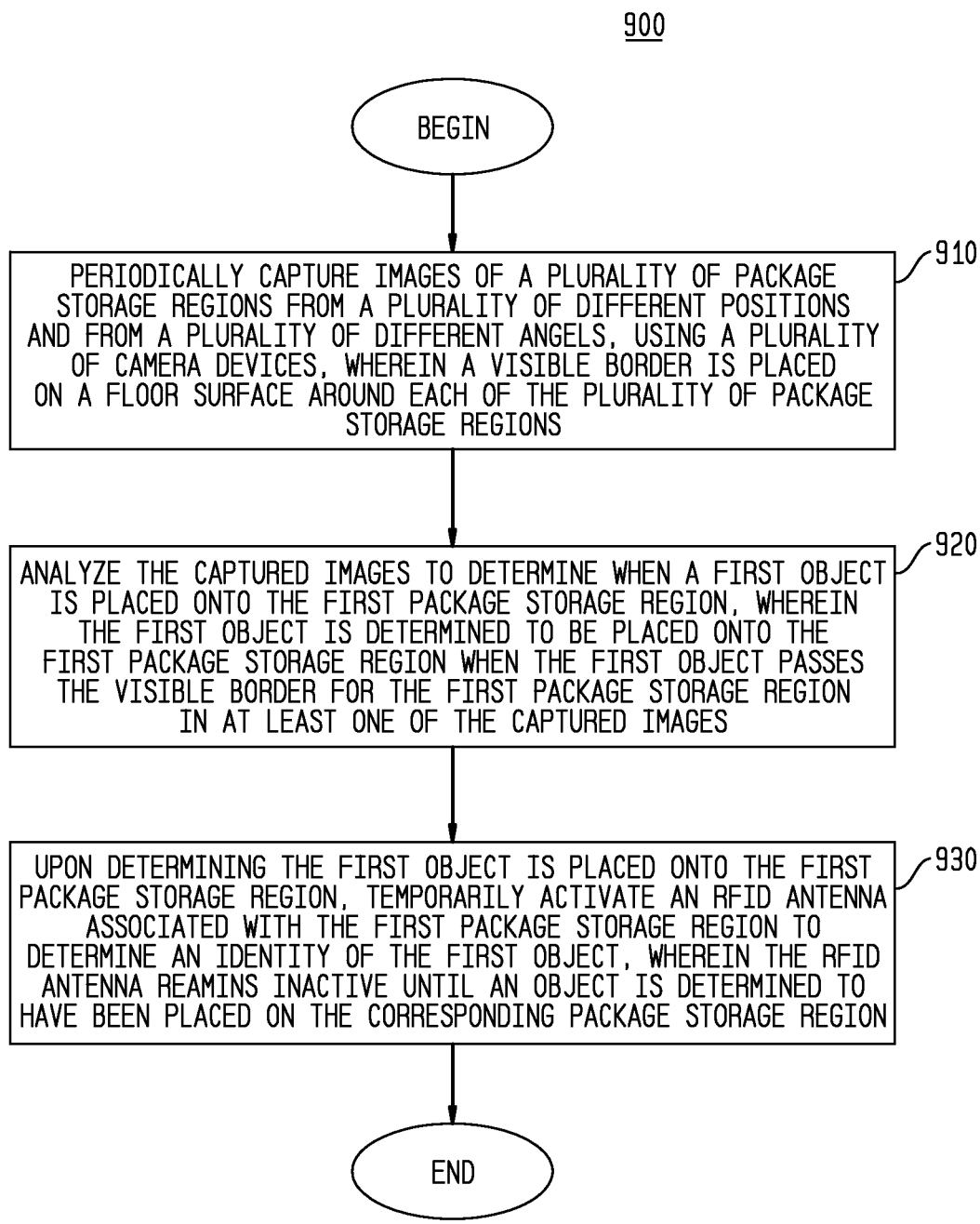

MULTI SENSOR DOMAIN—MULTI TIER CAMERA SYSTEM FOR PACKAGE IDENTIFICATION

BACKGROUND

The present invention relates to object tracking, and more specifically, to tracking packages being placed onto pallets using radio frequency identification (RFID) and imaging systems.

Shipping warehouses can use radio frequency identification (RFID) systems to track inventory. RFID tags, which can be passive or active, are disposed on the inventory (e.g., individual packages or pallets) in the warehouse and are programmed with information identifying the associated inventory. The identifying information is read from the RFID tags by RFID readers. In one example, the RFID readers are located at loading docks or along conveyor belts so that the RFID system can detect when RFID tags (and the corresponding inventory) pass through.

In other examples, RFID systems are disposed over pallets or other storage areas (e.g., containers) where packages are being stowed. Identifying and tracking all the packages placed onto pallets or in the containers, however, can be slow. That is, as the number of packages on a pallet increases, the amount of time required to inventorize (i.e., identify all the packages in the container) also increases. Tracking the packages to ensure the packages are on the correct pallet or in the correct container can take too long, and a result, the RFID system may be unable to provide prompt feedback to an associate stowing the packages.

BRIEF DESCRIPTION OF DRAWINGS

FIG. 7 is a flow diagram illustrating a method for providing a notification when an object is mis-sorted onto a pallet, according to one embodiment described herein.

FIG. 8 is a flow diagram illustrating a method for determining whether an object was placed correctly on a pallet, according to one embodiment described herein.

FIG. 9 is a flow diagram illustrating a method for selectively activating an RFID reader to identify an item on a pallet, according to one embodiment described herein.

DETAILED DESCRIPTION

Figure 1:
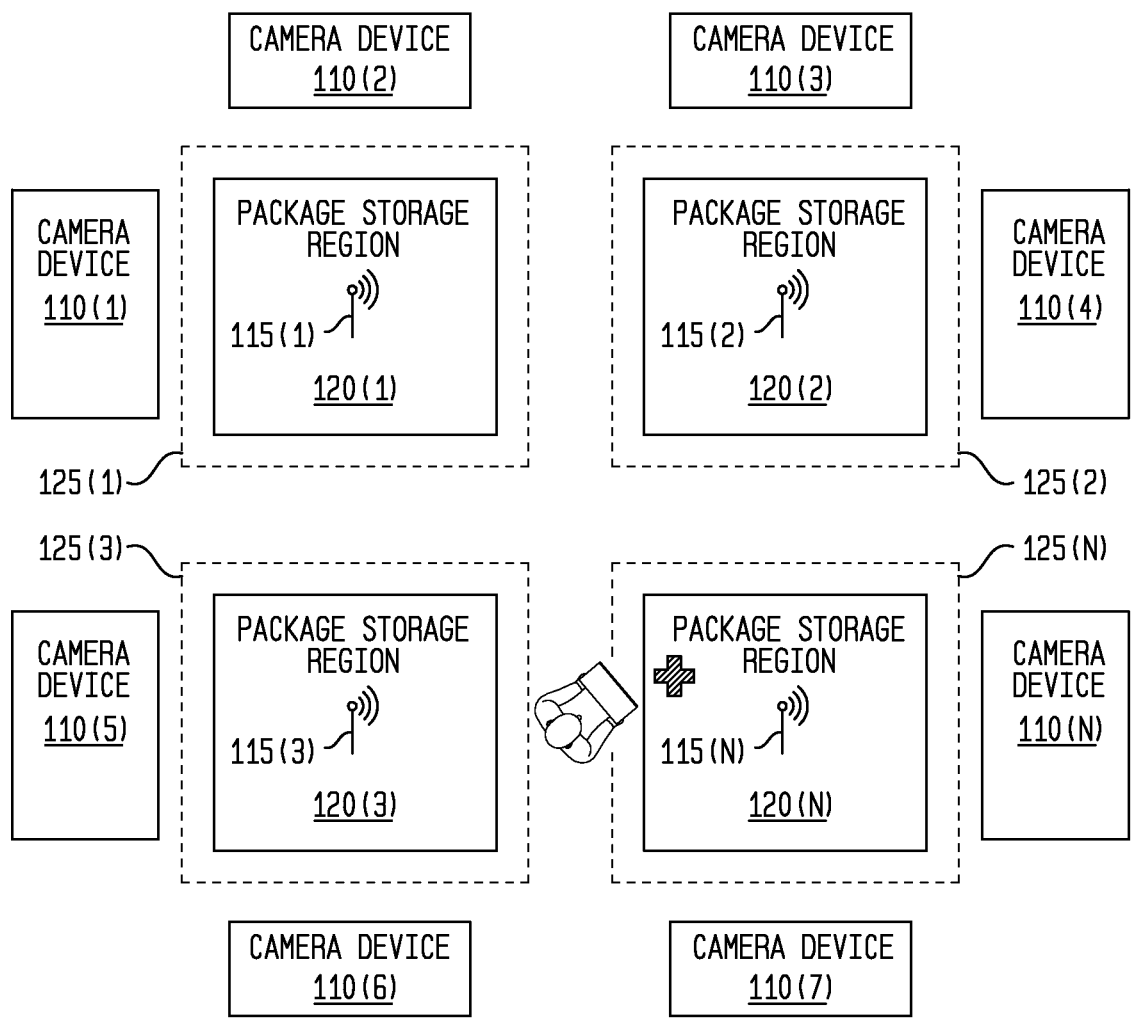
FIG. 1 is a block diagram illustrating a sorting environment configured with RFID antennas and camera devices, according to one embodiment described herein.

Embodiments described herein provide a package management system that uses RFID readers in combination with camera devices to provide feedback to an associate when a package has been mis-sorted. In one embodiment, the RFID readers are attached to one or more RFID antennas which each are disposed overhead a respective pallet or storage location in a warehouse. For example, each of the antennas may have a read region that covers a container (e.g., a pallet box), a respective staging location, or a sorting area. Using a RFID antenna, a RFID reader can query the RFID tags in its assigned container or location to identify the packages in the container.

However, RFID readers can struggle to accurately determine which of multiple nearby containers an object has been placed into. For example, in a warehouse where multiple pallets are placed in proximity to one another, RFID readers may not be able to identify which pallet a given package has been placed on with an acceptable level of accuracy. Moreover, in a fast-paced warehouse environment, false positives on sorting errors can introduce an unacceptable level of confusion and delay. Additionally, conventional solutions that rely solely on RFID readers to identify mis-sorted items may take an unsuitable amount of time (e.g., several seconds) to identify which pallet most likely contains a new package. As such, by the time the RFID reader determines an associate has mis-sorted a package (i.e., placed the package in the wrong container), the associate may have walked away from the container to pick up another package. Providing feedback promptly (e.g., before the associate has picked up another package to stow) can improve the efficiency of the associate and reduce mis-sort errors.

In one embodiment, a system for monitoring objects being placed onto a plurality of pallets, includes a feedback mechanism for notifying a user placing objects onto the plurality of pallets, a plurality of camera devices configured to capture images of the plurality of pallets, a plurality of RFID antennas, each comprising a respective read region covering a respective one of the plurality of pallets, a RFID reader configured to identify a respective one or identifiers corresponding to a respective one or more objects on each of the plurality of pallets, and a controller. The controller can be configured to analyze images captured by the plurality of camera devices to determine when a first object is placed onto a first one of the plurality of pallets. Upon determining that the first object has been placed onto the first pallet, the controller can determine a first identifier corresponding to the first object using the RFID reader corresponding to the first pallet. The controller can determine an intended pallet corresponding to the first object and, upon determining that the first pallet onto which the first item was placed is not the intended pallet for the first item, the controller can notify the user using the feedback mechanism.

FIG. 1 is a block diagram illustrating a sorting environment configured with RFID antennas and camera devices, according to one embodiment described herein. As shown, the warehouse environment 100 includes a plurality of pallets 120(1)-(N), which are monitored by a plurality of camera devices 110(1)-(N) and a plurality of RFID antennas 115(1)-(N). Each of the pallets 120(1)-(N) is surrounded by a border 125(1)-(N). For example, the border 125(1)-(N) could be a visible border, such as colored tape or another material affixed to the floor around the pallets with an adhesive. In such an embodiment, a package identification management component can analyze images captured by the plurality of camera devices 110(1)-(N) In one embodiment, the border 125(1)-(N) is implemented as a photoelectric presence sensor (e.g., a light curtain) that can detect when an object is placed onto one of the pallets 120(1)-(N).

In one embodiment, a conveyor belt (not pictured) carries packages to different parts of the warehouse. During sorting, an associate picks up one of the packages (e.g., from the conveyor belt or another location) and carries the package to the depicted area which has several pallets 120(1)-(N) containers 130 for storing the packages 115 according to a sorting criteria. In one example, the sorting criteria may include the geographic region of a mailing address (or destination of the packages). The associate may look at a postal code on a shipping label on the package to identify which pallet 120(1)-(N) she should place the package in. In another example, the sorting criteria may be a particular shipping company assigned to deliver the packages to their destinations. For example, each of the pallets 120(1)-(N) may correspond to a different shipping company. A visual mark on the package can inform the associate which of the pallets 120(1)-(N) should store the package.

The pallets 120(1)-(N) can be any suitable apparatus with a form factor for holding multiple shipping packages—e.g., a pallet, a pallet box, bag, bin, etc. Moreover, although pallets 120(1)-(N) are shown, the packages may be placed in a defined region—e.g., a staging area—on the floor of the warehouse rather than being placed in a container. For example, tape or paint may be used to define the boundaries of the staging areas which the associate can use to place the package in the correct region. As used herein, a "package storage region" can include a defined region—e.g., a staging area—or a container that has a form factor for storing multiple packages.

The associate, however, can make a mistake when moving the packages from the conveyor belt to the appropriate pallet 120(1)-(N). For example, the associate may misread the shipping label or forget which container is associated with which postal code. Because the associate may sort thousands of packages during a shift, mental fatigue may cause mistakes which result in the packages being sorted incorrectly. The mis-sorted packages may be mailed to the wrong location which can delay the delivery date to the customer and incur additional costs to rectify. To mitigate mis-sorting, the warehouse includes the RFID antennas 115(1)-(N) and the camera devices 110(1)-(N) to detect and rectify mis-sorted packages before the packages can leave the warehouse.

In one embodiment, the RFID antennas 135 are positioned or adjusted such that their corresponding read regions (also referred to as radiation patterns, beam patterns, or read zones) cover one of the pallets 120(1)-(N). To ensure the RFID antennas 115(1)-(N) can detect packages regardless of where those packages are in the pallet, the beam pattern may extend to the region surrounding the pallets (e.g., less than a meter). Nonetheless, in one embodiment, the RFID antennas are positioned such that the beam pattern does not cover a neighboring pallet. That is, the beam pattern of the RFID antenna 115(1) may cover pallet 120(1) (and its surrounding area) but not pallet 120(2). Thus, when active, the RFID antenna 115(1) transmits and receives signals for identifying RFID tags in the pallet 120(1) but would not detect RFID tags disposed in pallet 120(2) (or any of the other pallets). Nonetheless, the beam patterns for the RFID antenna 115(1) and antenna 115(2) may overlap in the area between the pallets 120(1) and 120(2).

To control the read regions such that they cover only a desired pallet 120(1)-(N) (or region), in one embodiment, the RFID antennas 115(1)-(N) are disposed a set height overhead the pallets 120(1)-(N) (e.g., 2-3 meters). In one embodiment, the RFID antennas 115(1)-(N) are set at least 2.4 meters (e.g., around 8 feet) above the pallets 120(1)-(N) since some pallet boxes can be 2.1 meters tall (e.g., around 7 feet). Moreover, the antennas 115(1)-(N) may have a narrow beam width such that the emitted radiation strikes only the pallet 120(1)-(N) (or the area immediately around the pallet). Further, the power can be controlled to prevent the read regions of the RFID antennas 115(1)-(N) from extending to neighboring pallets 120(1)-(N). By adjusting or controlling these factors, the pallets 120(1)-(N) can be spaced close to each other (e.g., within a few feet) but still have confined beam patterns so that the RFID antennas 115(1)-(N) can identify only the tags that are disposed in their assigned pallets 120(1)-(N) or the immediate vicinity.

The antennas 115(1)-(N) have a polarization which permits them to receive RFID signals regardless of the orientation of the RFID tags in the pallets 120(1)-(N). That is, when stowed in the containers, the RFID tags (which are typically linearly polarized) may have different orientations. As such, the RFID antennas 115(1)-(N) may have multilinear polarizations or be circularly polarized to communicate with the RFID tags regardless of the orientation of the packages and tags in the pallets 120(1)-(N).

Typically, the antennas 115(1)-(N) are configured to remain inactive until the package identification management component determines that a package has been placed onto one of the pallets 120(1)-(N). Particularly in embodiments where the pallets 120(1)-(N) are relatively close together, the RFID antennas 115(1)-(N) may struggle to precisely identify which pallet 120(1)-(N) a particular package has been placed on. As such, the package identification management component can selectively activate one of the RFID antennas 115(1)-(N) when a package has been determined to have been placed on the corresponding pallet, based on an analysis of the images captured by the camera devices 110(1)-(N). Doing so enables the selected RFID antenna to more accurately read the RFIDs of objects on the corresponding pallet, without interference from other RFID antennas.

In the depicted embodiment, the employee is depicted as placing a package on the pallet 120(N). Generally, the RFID antennas 115(1)-(N) can remain inactive until the package identification management component determines that the employee has placed the package on one of the pallets 120(1)-(N). For example, the package identification management component could periodically capture images of a plurality of pallets 120(1)-(N) from a plurality of different positions and from a plurality of different angles, using the plurality of camera devices 110(1)-(N). The package identification management component could analyze the captured images to determine when a first object is placed onto the first pallet. For example, the package identification management component could determine that the first object was placed onto the first pallet when the first object passes the visible border 125(N) for the first pallet 120(N) in at least one of the captured images.

Upon determining the first object is placed onto the first pallet, the package identification management component could temporarily activate the RFID antenna 115(N) to determine an identity of the first object. By temporarily activating only one of the RFID antennas 115(1)-(N) at a time, the package identification management component can more accurately read the RFIDs for the objects on the corresponding pallet. To determine the ID of the newly placed package, the package identification management component can compare the set of RFIDs for objects currently on the pallet with a previous set of RFIDs for objects that were on the pallet when an item was last placed on the pallet. The package identification management component can then determine that the newly placed item corresponds to the RFID that is currently present on the pallet but was not present at the previous reading.

The package identification management component could then determine whether the package was properly placed on the pallet 120(N). For example, the package identification management component could access profile information for a shipping management system to determine which pallet 120(1)-(N) the package should have been placed on. The package identification management component could then determine whether the pallet 120(N) was the proper pallet for the associate to place the package on. If the package identification management component determines that the pallet 120(N) is not the correct pallet for the package, the package identification management component could generate a notification to a feedback device worn by the employee, providing real-time feedback that the package was incorrectly placed on the pallet 120(N). For example, the employee could be wearing a wristband feedback device and the package identification management component can transmit a control instruction to the wristband feedback device, instructing the feedback device to actuate one or more haptic feedback devices, in order to notify the employee that the package was mis-sorted onto the pallet 120(N).

In one embodiment, a computer vision-based solution could be used that both determines when packages are placed onto one of the pallets and determines the identity of the packages, based on an analysis of images captured by the camera devices monitoring the pallets. For example, such a CV setup could calibrate each of the camera devices using fiduciaries (e.g., a data matrix barcode) placed around each of the pallets. For example, such fiduciaries could be placed around the four corners of each pallet and in the center of each pallet. In one embodiment, each of the fiduciaries comprises a two-dimensional code or shape that can be uniquely identified in an analysis of captured images. A camera device could then capture an image of an empty pallet and calibrate an image analysis component to recognize the edges of the pallet structure in subsequent images, based on the positions of the fiduciaries within the image.

Additionally, camera attributes such as the camera device's field of view can be calibrated, based on the positions of the fiduciaries within the captured image. Embodiments can also trigger various workflow events within the fulfillment center environment, based on the detection of the fiduciaries within a captured image of a pallet. For example, upon detecting the fiduciaries, embodiments can trigger events such as pallet open and/or pallet close events, which could lead to the generation of a manifest detailing the items that were placed on pallet, and so on. As another example, embodiments could trigger a camera calibration event (e.g., as even previously calibrated cameras may become less calibrated over time, due to vibrations within the fulfillment center, temperature changes, and so on.

Figure 2:
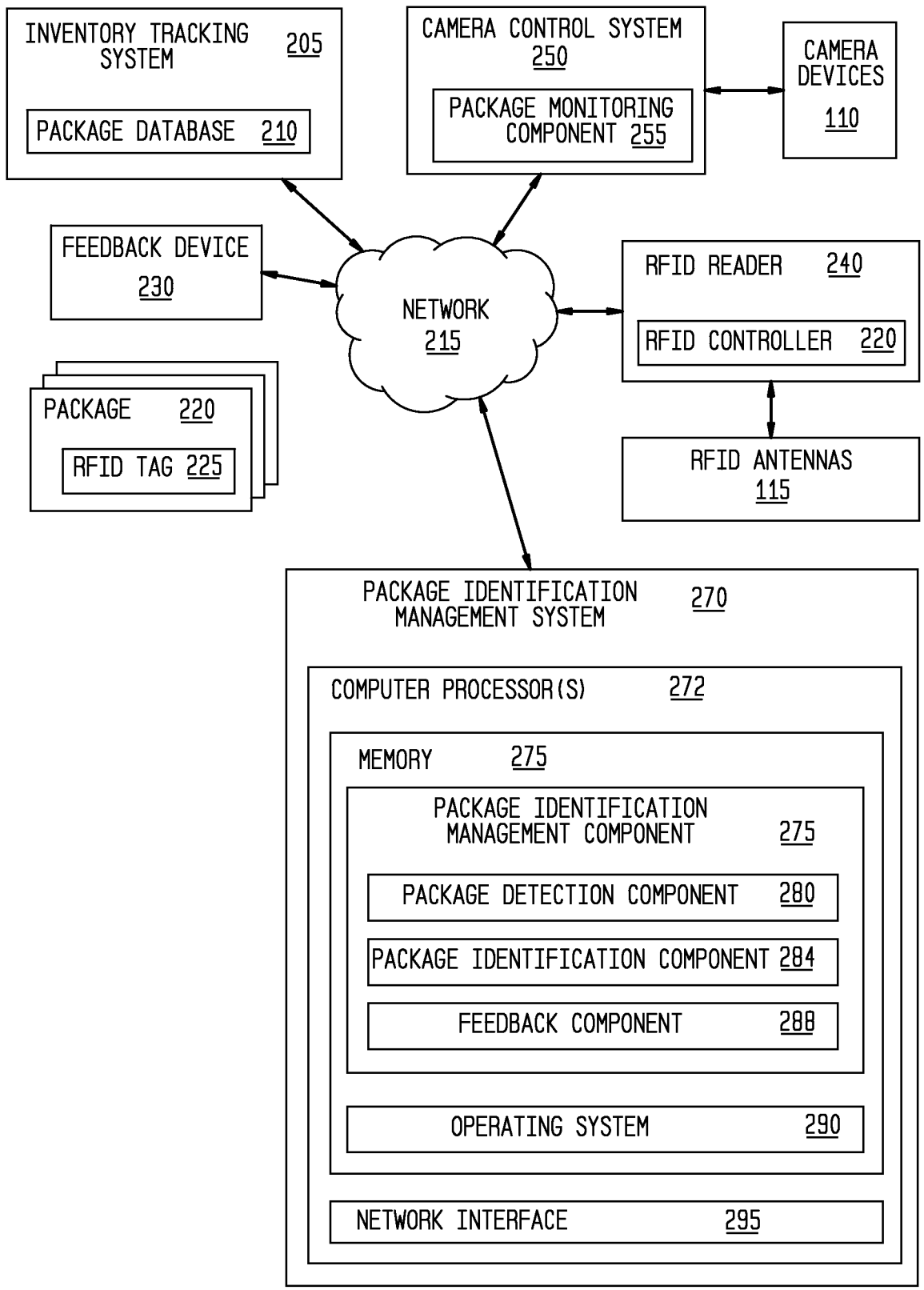
FIG. 2 is a block diagram illustrating a system that includes a package identification management component, according to one embodiment described herein.

FIG. 2 is a block diagram illustrating a system that includes a package identification management component, according to one embodiment described herein. As shown, the system 200 includes an inventory tracking system 205, a camera control system 250, a feedback device 230, a RFID reader 240 and a package identification management system 270, all interconnected via a network 215. The inventory tracking system 205 contains a package database 210. Generally, the package database 210 can contain data specifying which pallet each package should be placed on. As discussed above, the pallets can be used for organizing packages for shipment (e.g., each pallet could correspond to a different shipping carrier) or more generally for any suitable purpose within a fulfillment center.

The feedback device 230 can be any visual, audio, or haptic device that can provide positive or negative feedback to the associate. For example, the feedback device 230 may be a display which displays messages to the associate, a speaker which outputs audio instructions or commands, or a vibration motor. If the associate correctly stows the package 220, the package identification management component 275 can using the feedback device 230 to inform the associate who can then proceed to return to the conveyor belt (or any other suitable location) and retrieve a different package 220. If the package was stowed in the wrong pallet, the package identification management component 275 can alert the associate using the feedback device 230.

In one embodiment, the feedback device 230 is worn on, or carried by, the associate. For example, the feedback device 230 may be an electronic watch, a mobile phone or tablet, a vest, pager, and the like. Alternatively, the feedback device 230 may be mounted or disposed at a stationary location in the warehouse. For instance, the feedback device 230 may be a light or display device mounted over each of the pallets. If the associate placed a package in the correct pallet, the light or display device may output a positive color (e.g., green). If the pallet is not the correct location of the package, the light or display device may output a negative color (e.g., red).

In one embodiment, the feedback device 230 is configured with an RFID tag specifying a unique identifier associated with the feedback device 230. For instance, the RFID tag could store Media Access Control (MAC) address of the feedback device, an Internet Protocol (IP) address corresponding to the feedback device, or more generally any identifier that corresponds to the feedback particular 230. For example, a smart watch feedback device could have an RFID tag embedded in wristband that stores the MAC address of the smart watch feedback device. The feedback component 288, upon determining to provide feedback to the smart watch feedback device, could read the RFID tag in the wristband of the smart watch feedback device (e.g., when the associate wearing the feedback device 230 places his or her hand over a particular pallet) to determine the device's MAC address using the RFID reader 240 and one or more RFID antennas 115. The feedback component 288 could then read the MAC address from the RFID tag and could use the MAC address to query or otherwise communicate with the feedback device 230. For example, the feedback component 288 could determine that the associate incorrectly placed a package on a particular pallet (e.g., based on a comparison of the intended pallet for the package with the pallet that the package was determined to be placed on) and could transmit an instruction to the feedback device 230 worn by the associate, using the device's MAC address, instructing the feedback device 230 to provide feedback that notifies the associate that the package was incorrectly placed (e.g., the feedback device 230 could actuate one or more eccentric rotating mass actuators within the feedback device 230 to cause a vibration effect).

The package identification management system 270 includes computer processor(s) 272, memory 274 and network interface 295. The memory 274 includes a package identification management component 275 and an operating system 290. The package identification management component 275 includes a package detection component 280, a package identification component 284 and a feedback component 288. Generally, the package detection component 280 can communicate with the camera control system 250 to determine when a package has been placed on a pallet. The package identification component 284 could communicate with the RFID controller 220 to control one of the RFID readers 240 to read the RFID tags 225 of packages 220 on the corresponding pallet. The feedback component 288 can communicate with the feedback device 230 to provide information to the associate placing the packages 220 on the pallets (e.g., to indicate the package was placed correctly, to indicate the package was placed incorrectly, etc.).

The camera control system 250 includes a package monitoring component 255 and is coupled to camera devices 260. Generally, the package monitoring component 255 can detect when one of the packages 220 is placed onto a pallet. For example, the camera devices 260 could be positioned to view the pallet from various different angles and different heights, and the package monitoring component 255 could analyze images captured by the camera devices 260 to determine when an associate has placed a package 220 on the pallet. When the package monitoring component 255 detects a package 220 has been placed on the pallet, the package monitoring component 255 could transmit this information to the package detection component 280. In one embodiment, the package monitoring component 255 transmits the images captured by the camera devices 260 to the package detection component 280, and the package detection component 280 is configured to analyze the digital images to detect when a package is placed on the pallet.

Upon detecting that a package 220 has been placed on the particular pallet, the package identification management component 275 could activate the corresponding RFID reader 240 to read the RFID tags 225 of packages 220 currently on the particular pallet. The package identification management component 275 could then compare the current set of identifiers with a previous set of identifiers from a previous point in time when the RFID reader 240 last scanned the pallet. The package identification management component 275 could then determine that the newly placed package is the package whose identifier is included in the current set of identifiers but was not included in the previous set of identifiers.

In one embodiment, the package identification management component 275 can determine the identity of the newly placed package on the pallet based at least in part on images captured by the camera devices 260 and sent to the package identification management component 275 by the package monitoring component 255. For example, the package identification management component 275 could analyze a region of a captured image that depicts the newly placed package and the package identification management component 275 could determine a barcode on the package that is visible within the captured image. The package identification management component 275 could then query the package database 210 with information relating to the depicted barcode in order to identify the package. Although such information may not always be available (e.g., if the package is placed on the pallet in such a manner that the barcode is not visible from the perspectives of the camera devices 260), the package identification management component 275 can consider such information when available to determine or to confirm the identity of the newly placed package.

Additionally, the package identification management component 275 can analyze the appearance of the newly placed package in the captured images to determine the package's identity. For example, the package identification management component 275 could compare the package's appearance with pre-defined three-dimensional models for various packages processed within the fulfillment center in order to determine which model the package's appearance most closely matches. In some embodiments, because such a visual analysis can be computationally expensive (and thus can be significantly slower than scanning the RFID tags of the packages), the package identification management component 275 can selectively use such a visual analysis only in limited contexts. For example, if the RFID tag scan detects two new packages on the pallet but the captured images indicate that only one new package has been placed on the pallet (i.e., the RFID scan has produced a false positive), the package identification management component 275 can compare the appearance of the newly placed package in the captured images with the three-dimensional models for the two new packages detected by the RFID scan and the package identification management component 275 can select the package that most closely matches the appearance of the package within the captured images.

The package identification management component 275 could then query the package database 210 on the inventory tracking system 205 to determine whether the package 220 was properly placed on the pallet. If the package identification management component 275 determines that the package was correctly placed on the pallet, the package identification management component 275 could transmit instructions to the feedback device 230 to provide corresponding feedback to the associate placing the package. Likewise, if the package identification management component 275 determines that the associate incorrectly placed the package on the pallet, the package identification management component 275 could provide the corresponding feedback to the feedback device 230. The feedback device 230 can then provide the appropriate feedback to the associate in real-time, allowing the associate to easily correct any mistakes. Advantageously, embodiments allow package placement errors in real-time and without requiring the associate to manually scan the packages and the corresponding pallets.

As another example, the package identification management component 275 could determine a unique identifier corresponding to the package 220 by querying the package database 210 and could energize the RFID antenna 115 corresponding to the proper pallet for the package 220 to be placed on, and could transmit using the RFID antenna 115 a message specifying the unique identifier corresponding to the package 220. Generally, the package 220 can be configured with an RFID tag 225 that is configured to respond to the message specifying the package's unique identifier. Upon receiving a response signal from the RFID tag 225, the RFID reader 240 can determine whether the package 220 was placed onto the pallet.

Figure 3:
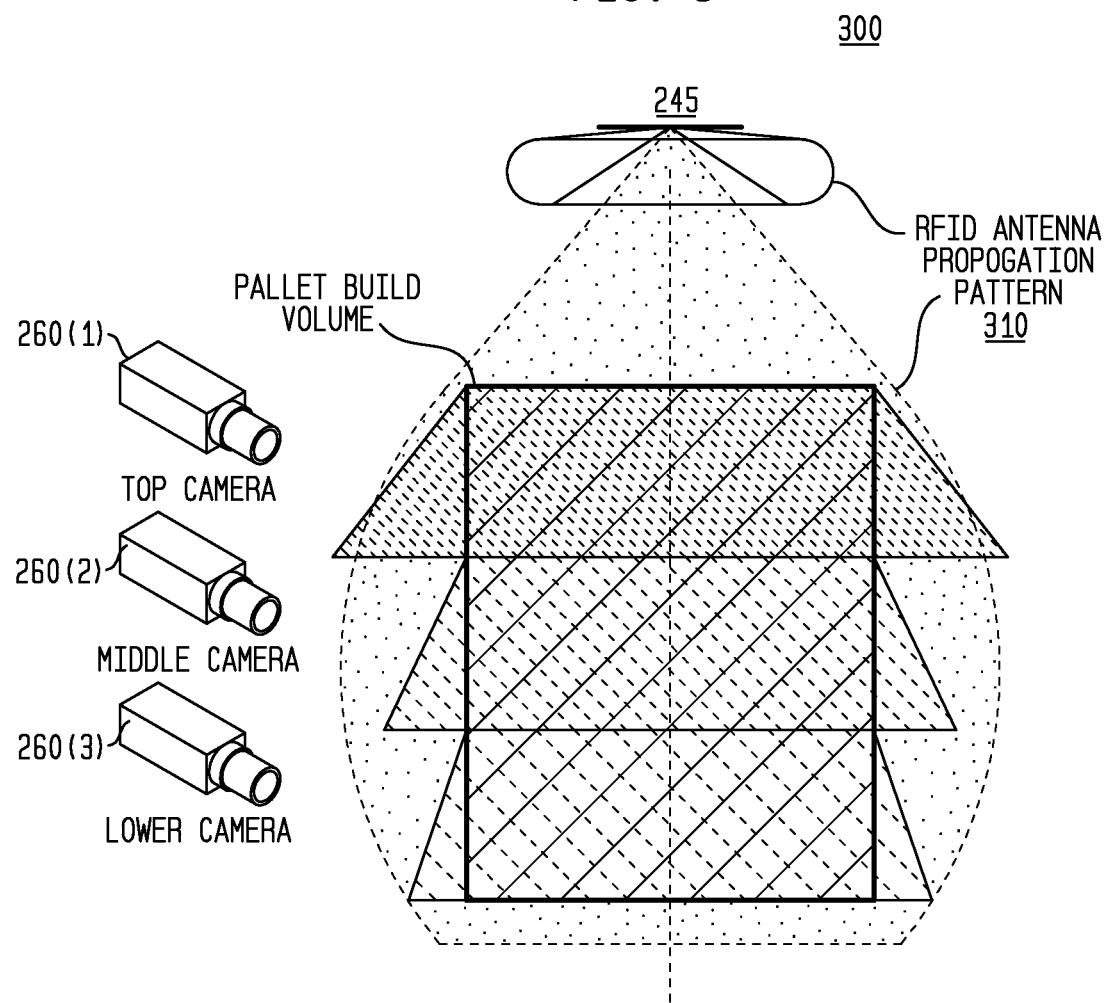
FIG. 3 illustrates a side-view of a pallet monitored using multiple camera devices and a RFID antenna, according to one embodiment described herein.

FIG. 3 illustrates a side-view of a pallet monitored using multiple camera devices and a RFID antenna, according to one embodiment described herein. As shown, the illustration 300 depicts a side-view of a pallet being monitored using the cameras 260(1)-(3) and an overhead RFID antenna 245. As shown, the cameras 260(1)-(3) are oriented in a multi-tiered manner, such that the camera 260(1) captures images of the top of the pallet, the camera 260(2) captures images of the middle section of the pallet, and the camera 260(3) captures images of the bottom of the pallet. While a multi-tiered configuration using three vertical cameras 260 is depicted, more generally any number and configuration of cameras 260 can be used, consistent with the functionality described herein.

Figure 4:
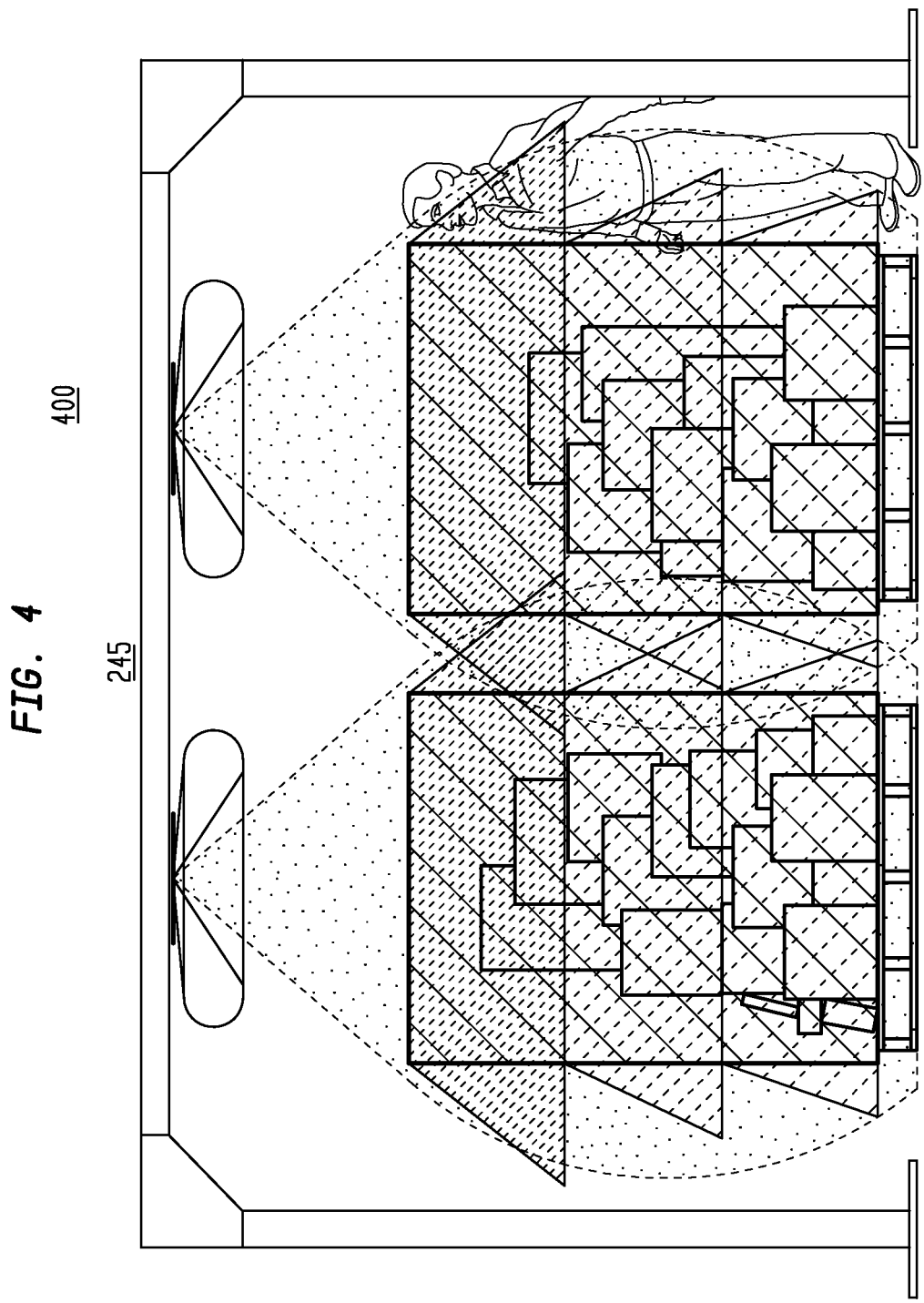
FIG. 4 illustrates a side-view of multiple pallets monitored using multiple camera devices and RFID antennas, according to one embodiment described herein.

The RFID antenna 245 is configured to project the RFID antennas propagation pattern 310. Generally, the propagation pattern 310 covers the entirety of the pallet. In some embodiments, to ensure coverage of the entire pallet, the propagation pattern 310 can cover some of the area adjacent to the pallet as well. An example of this is shown in FIG. 4, where the illustration 400 depicts a side-view of multiple pallets monitored using multiple camera devices and RFID antennas, according to one embodiment described herein. In conventional systems, having the RFID antenna's propagation pattern 310 cover the area outside of the pallet can lead to false positives in item detection, as such conventional solutions could detect RFID tags 225 on packages 260 as an employee walks by the pallet. Advantageously, by selectively activating the RFID antennas 245 when the camera control system 250 has detected a package being placed on a pallet, embodiments can be more accurately detect packages being placed onto the pallets.

Figure 5:
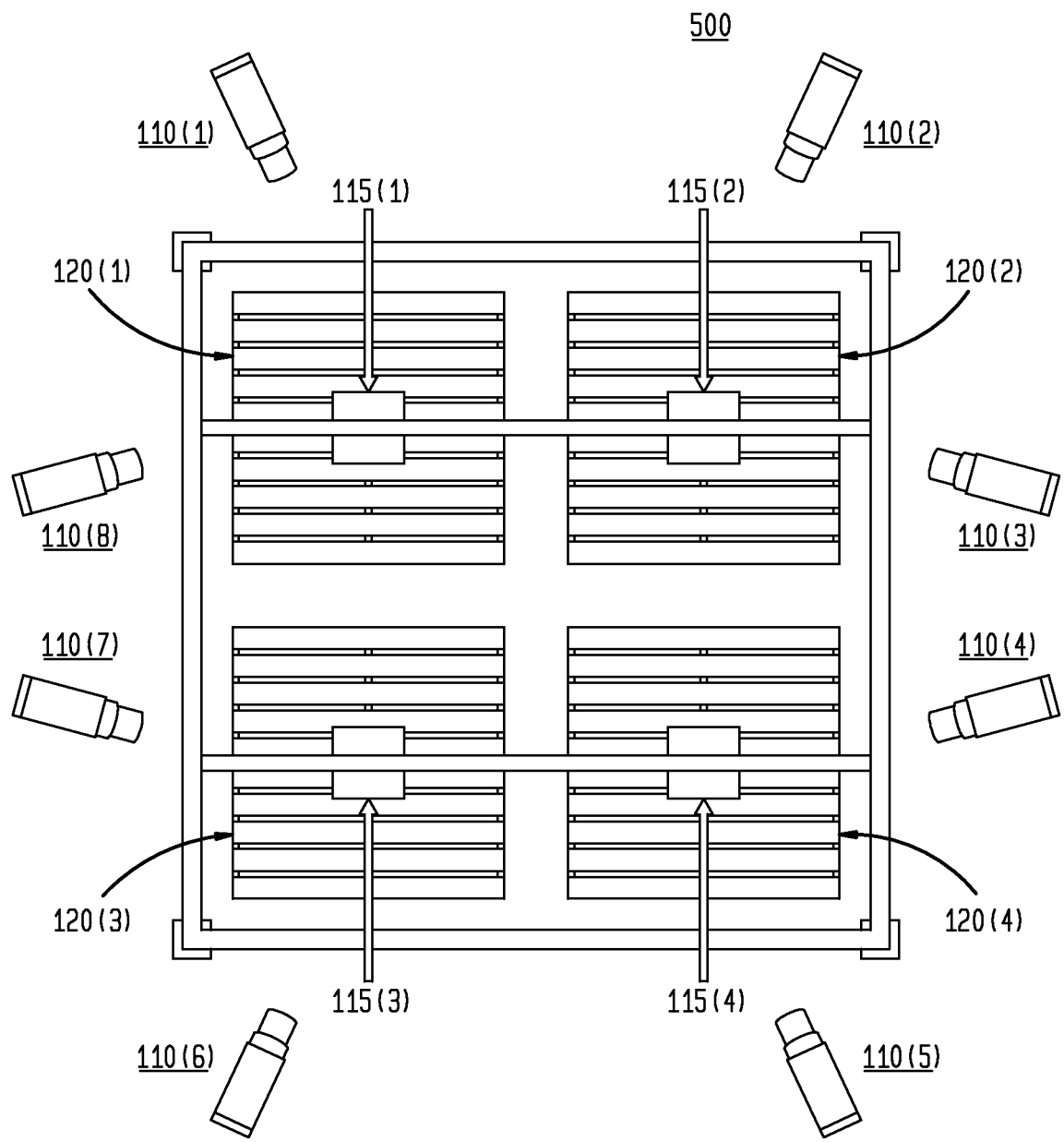
FIG. 5 illustrates a warehouse environment with multiple pallets monitored using camera devices and RFID antennas, according to one embodiment described herein.

FIG. 5 illustrates a warehouse environment with multiple pallets monitored using camera devices and RFID antennas, according to one embodiment described herein. As shown, the environment 500 depicts multiple pallets 120(1)-(4). Above each of the pallets 120(1)-(4) is a corresponding RFID antennas 245(1)-(4). In the depicted embodiment, the RFID antennas 245(1)-(4) are configured to project a propagation pattern as shown in FIGS. 3 and 4, discussed above. More generally, however, any RFID propagation pattern suitable for detecting RFID tags 225 on packages 260 on the corresponding pallet 120(1)-(4) can be used, consistent with the functionality described herein.

Figure 6A:
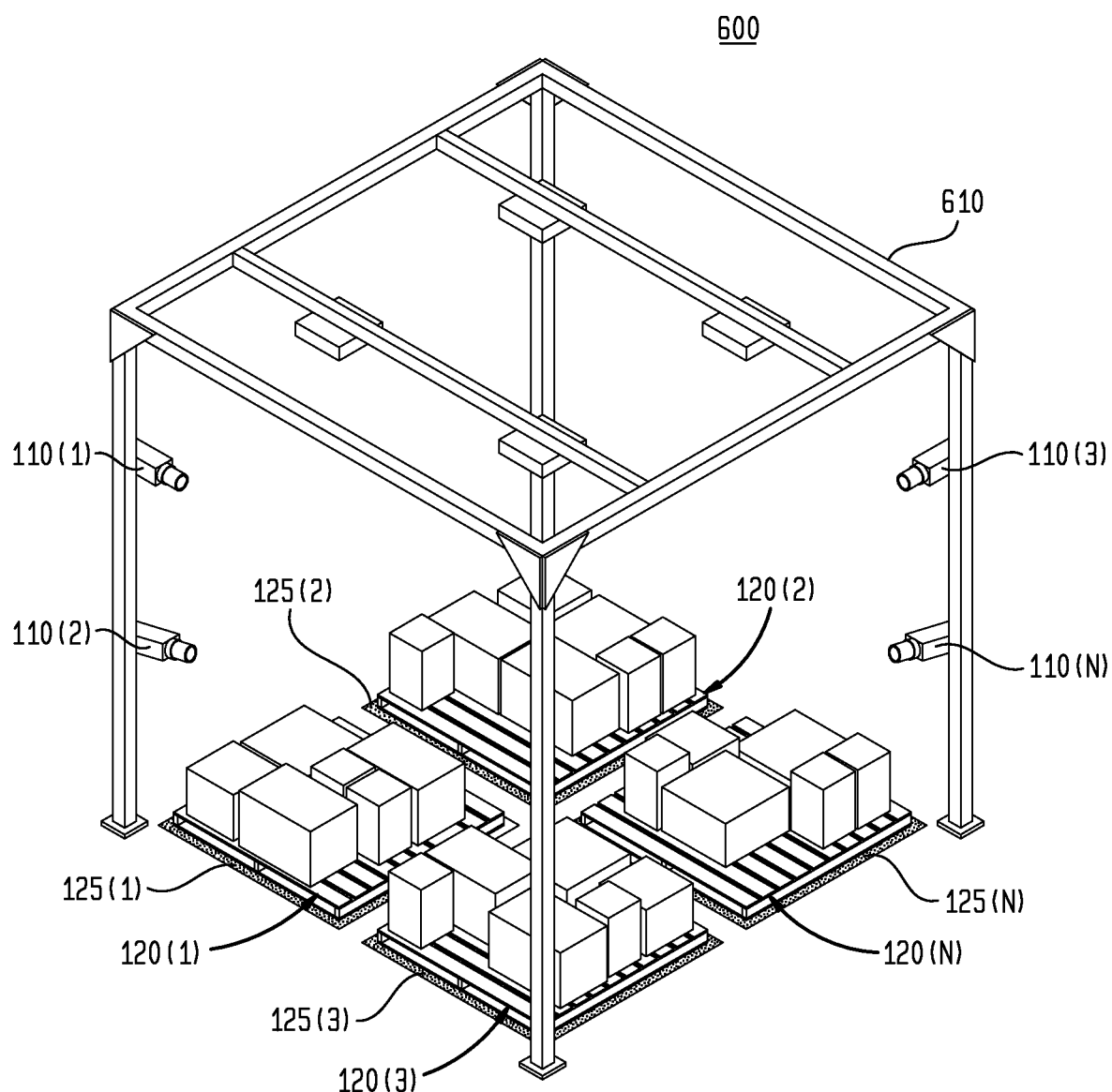
FIGS. 6A-B illustrate a warehouse environment with multiple pallets monitored using camera devices and RFID antennas, according to one embodiment described herein.

Additionally, camera devices 260(1)-(8) are positioned around the pallets 120(1)-(4). As discussed above, the package detection component 280 can analyze images captured by the plurality of camera devices to determine when a first object is placed onto a first one of the plurality of pallets. For example, a visual border could be placed around each of the pallets and the package detection component 280 could analyze the captured imagers to determine when a package crosses the boundary of the visual border. An example of one such border is shown in FIG. 6A, which illustrates a warehouse environment with multiple pallets monitored using camera devices and RFID antennas, according to one embodiment described herein. As shown, the illustration 600 depicts a set of pallets 120(1)-(N) that are observed by camera devices 260(1)-(N) suspended from a framing structure 610. In the depicted embodiment, each pallet location is surrounded by a visual border 125(1)-(N). Generally, any suitable material can be used to create the border 125(1)-(N). In one embodiment, it is preferable to use a material and coloration that is easily recognized in images captured by the cameras 260(1)-(N).

Figure 6B:
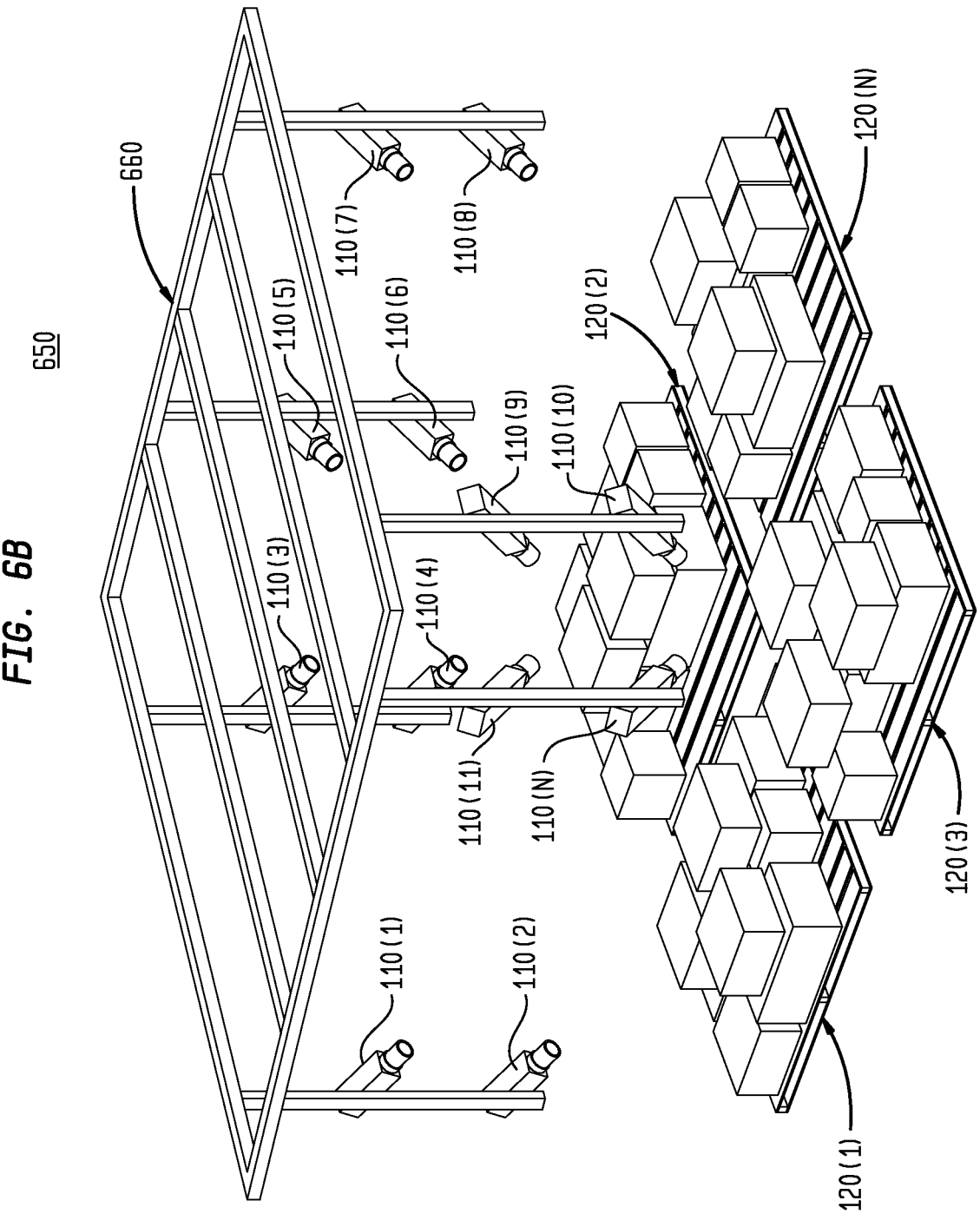

FIG. 6B illustrates an alternate embodiment 650, where a suspended structure 660 is positioned above the pallets 120(1)-(N). As shown in FIG. 6B, the camera devices 110(1)-(N) are attached at various points on the suspended structure 660, such that images of the pallets 120(1)-(N) can be captured from multiple different viewing angles. The suspended structure 660 could be affixed to the ceiling or another structure within a fulfillment center using steel cabling or any another suitable mechanism. Generally, the suspended structure 660 can be positioned above the pallets 120(1)-(N) at a height that facilitates capturing images of the pallets 120(1)-(N) using the camera devices 110(1)-(N). As such, the height for any particular implementation may depend, at least in part, on attributes of the camera devices 110(1)-(N) being used. One advantage to the suspended structure 660 over the framing structure 610 is that employees may be less likely to contact the suspended structure 660 and the affixed camera devices 110(1)-(N), while moving between the pallets 120(1)-(N).

Upon determining that the first object has been placed onto the first pallet, the package identification component 284 can determine a first identifier corresponding to the first object using the RFID reader corresponding to the first pallet. For example, the package identification component 284 could determine the set of RFIDs for RFID tags 225 of packages 220 that are currently on the pallet, and the package identification component 284 could compare the current set of RFIDs with a previous set of RFIDs that were read from RFID tags 225 of packages 220 that were previously on the pallet before the first object was placed on the pallet. More generally, any suitable technique for determining the identity of the newly placed package on the pallet can be used.

Additionally, the package identification component 284 can determine an intended pallet corresponding to the first object. For example, the package identification component 284 can query the package database 210 on the inventory tracking system 205 to determine the correct pallet for the given package. If the pallet onto which the package was placed is determined to be the correct pallet, the package identification component 284 can transmit an instruction to the feedback device 230 to provide positive feedback to the associate. Similarly, if the pallet onto which the package was placed is determined to be the incorrect pallet for the package, the package identification component 284 can transmit an instruction to the feedback device 230 to provide negative feedback to the associate.

In one embodiment, the package identification management component 275 can identify the newly placed package on the pallet based on images captured by the camera devices 260. As an example, the package identification management component 275 can analyze a region of a captured image that depicts the newly placed package. The package identification management component 275 can identify a barcode on the package that is visible within the captured image. The package identification management component 275 could then query the package database 210 with the barcode (or information corresponding to the barcode) to identify the package. Although such information may not always be available (e.g., if the package is placed on the pallet in such a manner that the barcode is not visible from the perspectives of the camera devices 260), the package identification management component 275 can consider such information when available to determine or to confirm the identity of the newly placed package.

Additionally, the package identification management component 275 can determine the package's identity based on the appearance of the newly placed package in the captured images. For example, the package identification management component 275 could compare the package's appearance with three-dimensional models for various packages processed within the fulfillment center to determine which three-dimensional model the package's appearance most closely matches. In some embodiments, the package identification management component 275 is selective with its use of such a visual analysis. For example, if the RFID tag scan detects multiple new packages on the pallet but the captured images indicate that only one new package has been placed on the pallet (i.e., the RFID scan has produced a false positive), the package identification management component 275 can compare the appearance of the newly placed package in the captured images with the three-dimensional models for the multiple new packages detected by the RFID scan and the package identification management component 275 can select the package that most closely matches the appearance of the package within the captured images.

FIG. 7 is a flow diagram illustrating a method for providing a notification when an object is mis-sorted onto a pallet, according to one embodiment described herein. As shown, the method 700 begins at block 710, where the package detection component 280 analyzes images captured by a plurality of camera devices to determine when a first object is placed onto a first pallet of a plurality of pallets. The package identification component 284 can, upon determining that the first object has been placed onto the first pallet, energize a RFID antenna corresponding to the first pallet and use a RFID reader and the energized RFID antenna to query a first identifier corresponding to the first object (block 720).

The package identification component 284 could determine an intended pallet corresponding to the first object (block 730). For example, the package identification component 284 could query the package database 210 on the inventory tracking system 205 to determine the intended pallet for the first object. Upon the package identification component 284 determining that the first pallet onto which the first object was placed is not the intended pallet for the first object, the feedback component 288 could transmit one or more instructions to the feedback device 230 to notify the user (block 740), and the method 700 ends.

FIG. 8 is a flow diagram illustrating a method for determining whether an object was placed correctly on a pallet, according to one embodiment described herein. As shown, the method 800 begins at block 810, where the package detection component 280 determines that a first object has been placed on a first one of the plurality of pallets, based on an observation of the first pallet using one or more camera devices. In response to determining that the first object was placed onto the first pallet, the package identification component 284 facilitates the energizing of an RFID antenna to determine a first identify corresponding to the first object, using a RFID reader associated with the first pallet (block 820). The package identification component 284 determines whether the first object was correctly placed on the first pallet (block 830), and the method 800 ends.

FIG. 9 is a flow diagram illustrating a method for selectively activating an RFID reader to identify an item on a pallet, according to one embodiment described herein. The method 900 begins at block 910, where the package detection component 280 periodically captures images of a plurality of package storage regions from a plurality of different positions and from a plurality of different angles, using a plurality of camera devices, where a visible border is placed on a floor surface around each of the plurality of package storage regions. The package detection component 280 analyzes the captured images to determine when a first object is placed onto the first package storage region, where the first object is determined to be placed onto the first package storage region when the first object passes the visible border for the first package storage region in at least one of the captured images (block 920). Upon the package detection component 280 determining that the first object is placed onto the first package storage region, the package identification component 284 temporarily activates an RFID antenna associated with the first package storage region to determine an identify of the first object, where the RFID antenna remains inactive until an object is determined to have been placed on the corresponding package storage region (block 930), and the method 900 ends.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGs. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system for monitoring objects being placed onto a plurality of pallets, comprising:
    a feedback mechanism for notifying a user placing objects onto the plurality of pallets;
    a plurality of camera devices configured to capture images of a build volume of the plurality of pallets;
    a plurality of radio-frequency identification (RFID) antennas, each comprising a respective read region covering a respective one of the plurality of pallets;
    a RFID reader configured to identify, using at least one of the RFID antennas, a respective one or more identifiers from a respective one or more RFID tags corresponding to a respective one or more objects on each of the plurality of pallets; and
    a controller configured to:
        analyze images captured by the plurality of camera devices to determine when a first object is placed onto a first one of the plurality of pallets;
        upon determining that the first object has been placed onto the first pallet, energize the RFID antenna corresponding to the first pallet and use the RFID reader and the energized RFID antenna to determine a first identifier corresponding to the first object by:
            determining a plurality of identifiers corresponding to a plurality of objects on the first pallet using the RFID reader and the RFID antenna corresponding to the first pallet;
            comparing the plurality of identifiers to a previous one or more identifiers read by the RFID reader and the RFID antenna corresponding to the first pallet prior to the first object being placed on the first pallet; and
determining, based on the comparison, that the first identifier is included within the plurality of identifiers and not included within the previous one or more identifiers;
determine an intended pallet corresponding to the first object; and
upon determining that the first pallet onto which the first object was placed is not the intended pallet for the first object, notify the user using the feedback mechanism.

2. The system of claim 1, wherein a visible border is placed on a floor surface around each of the plurality of pallets, and wherein the controller is configured to determine that the first object is placed onto the first pallet when the first object passes the visible border for the first pallet in at least one of the captured images.

3. The system of claim 1, wherein the RFID antennas remain inactive until the controller determines, based on the captured images, that an object is placed onto one of the pallets.

4. The system of claim 1, wherein the controller is configured to determine the first identifier corresponding to the first object using the RFID reader further by, at least in part:
transmitting an interrogator signal specifying the first identifier corresponding to the first object using the RFID antenna corresponding to the first pallet; and
upon receiving a reply message from an RFID tag associated with the first object, determining that the first object was placed on the first pallet.

5. The system of claim 1, wherein the feedback mechanism comprises a wearable device that is worn by the user, and wherein the feedback mechanism includes one or more haptic feedback mechanisms that are actuated when notifying the user that the first object was not placed on the intended pallet.

6. The system of claim 1, wherein the plurality of camera devices configured to capture images of the build volume of the plurality of pallets are oriented in a multi-tiered structure, such that images can be captured of each pallet from multiple different angles and at multiple different heights.

7. The system of claim 1, wherein the controller is configured to determine the first identifier corresponding to the first object further based on one or more of the images captured by the plurality of camera devices.

8. The system of claim 7, wherein the controller is configured to determine the first identifier corresponding to the first object further based on visual attributes of the first object within the one or more images, the visual attributes comprising at least one of (i) a barcode of the first object and (ii) an appearance of the first object, and comparing the visual attributes with predefined object data to determine the first identifier.

9. A pallet monitoring system, comprising:
one or more computer processors; and
a memory containing computer program code that, when executed by operation of one or more computer processors, performs an operation for monitoring objects being placed onto a plurality of pallets, the operation comprising:
determining that a first object has been placed onto a first one of the plurality of pallets, based on an observation of the first pallet using one or more camera devices;
in response to determining that the first object was placed onto the first pallet, energizing a radio-frequency identification (RFID) antenna to determine a first identity corresponding to the first object, using an RFID reader associated with the first pallet, wherein determining the first identity corresponding to the first object using the RFID reader associated with the first pallet comprises:
determining a plurality of identifiers corresponding to a plurality of objects on the first pallet using the RFID reader associated with the first pallet;
comparing the plurality of identifiers to a previous one or more identifiers read by the RFID reader associated with the first pallet prior to the first object being placed on the first pallet; and
determining, based on the comparison, that the first identity is included within the plurality of identifiers and not included within the previous one or more identifiers; and
determining whether the first object was correctly placed on the first pallet.

10. The pallet monitoring system of claim 9, wherein determining whether the first object was correctly placed on the first pallet comprises:
accessing an object profile corresponding to the first object to determine an intended destination of the first object; and
determining whether the first pallet corresponds to the intended destination of the first object.

11. The pallet monitoring system of claim 9, the operation further comprising:
upon determining that the first object was incorrectly placed on the first pallet, causing a feedback mechanism associated with a user placing the first object onto the first pallet to provide a notification to the user, indicating that the first object was incorrectly placed.

12. The pallet monitoring system of claim 9, wherein determining the first identity corresponding to the first object, using the RFID reader associated with the first pallet, further comprises:
upon determining that the first object has been placed onto the first pallet, activating the RFID reader in order to read the plurality of identifiers corresponding to the plurality of objects placed on the first pallet, wherein the RFID antenna associated with the first pallet remains inactive until the pallet monitoring system determines, based on the observation of the first pallet using the one or more camera devices, that the first object is placed onto the first pallet.

13. The pallet monitoring system of claim 11, wherein the feedback mechanism comprises a wearable device that is worn by the user, and wherein the feedback mechanism includes one or more haptic feedback mechanisms that are actuated when notifying the user that the first object was incorrectly placed on the first pallet.

14. A method, comprising:
periodically capturing images of a plurality of package storage regions from a plurality of different positions and from a plurality of different angles, using a plurality of camera devices, wherein a visible border is placed on a floor surface around each of the plurality of package storage regions;
analyzing the captured images to determine when a first object is placed onto a first package storage region of the plurality of package storage regions, wherein the first object is determined to be placed onto the first package storage region when the first object passes the visible border for the first package storage region in at least one of the captured images; and upon determining the first object is placed onto the first package storage region, temporarily activating a radio-frequency identification (RFID) antenna associated with the first package storage region to determine an identity of the first object, comprising:

determining a plurality of identifiers corresponding to a plurality of objects on the first package storage region using an RFID reader associated with the RFID antenna;

comparing the plurality of identifiers to a previous one or more identifiers read by the RFID reader associated with the RFID antenna prior to the first object being placed onto the first package storage region; and determining, based on the comparison, that the identity of the first object is included within the plurality of identifiers and not included within the previous one or more identifiers, wherein the RFID antenna remains inactive until the first object is determined to have been placed on the first package storage region.

15. The method of claim 14, further comprising:

upon determining that the first package storage region onto which the first object was placed is not an intended package storage region for the first object, providing a notification using a feedback device.

16. The method of claim 14, wherein:

a plurality of RFID antennas are positioned above the plurality of package storage regions, such that each of the plurality of RFID antennas corresponds to a respective one of the plurality of package storage regions; and each of the RFID antennas is only energized upon determining, based on images captured by a plurality of camera devices, that an object has been placed onto a corresponding one of the plurality of package storage regions.

17. The method of claim 14, determining the identity of the first object is further based on one or more of the images captured by a plurality of camera devices.

18. The method of claim 17, wherein determining the identity of the first object is further based on visual attributes of the first object within the one or more images, the visual attributes comprising at least one of (i) a barcode of the first object, and (ii) an appearance of the first object, and comparing the visual attributes with predefined object data to determine the identity of the first object.

* * * * *